US010430140B2

(12) United States Patent
Wang et al.

(10) Patent No.: US 10,430,140 B2
(45) Date of Patent: *Oct. 1, 2019

(54) METHOD, APPARATUS AND SYSTEM FOR OPENING A WEB PAGE

(71) Applicant: Tencent Technology (Shenzhen) Company Limited, Shenzhen (CN)

(72) Inventors: Qian Wang, Shenzhen (CN); Bo Qiu, Shenzhen (CN); Wei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 220 days.

This patent is subject to a terminal disclaimer.

(21) Appl. No.: 15/589,546

(22) Filed: May 8, 2017

(65) Prior Publication Data
US 2017/0242645 A1    Aug. 24, 2017

Related U.S. Application Data

(63) Continuation of application No. 14/299,715, filed on Jun. 9, 2014, now Pat. No. 9,680,917, which is a (Continued)

(30) Foreign Application Priority Data

May 15, 2013 (CN) .......................... 2013 1 0179646

(51) Int. Cl.
*G06F 15/16* (2006.01)
*G06F 3/14* (2006.01)
(Continued)

(52) U.S. Cl.
CPC ........ *G06F 3/1423* (2013.01); *G06F 3/04845* (2013.01); *H04L 67/02* (2013.01); *H04L 67/10* (2013.01)

(58) Field of Classification Search
CPC ... G06F 3/04845; G06F 3/1423; H04L 67/02; H04L 67/10
(Continued)

(56) References Cited

U.S. PATENT DOCUMENTS 7,464,178 B2    12/2008  Corrigan et al.
2002/0046295 A1  4/2002  Asai
(Continued)

FOREIGN PATENT DOCUMENTS

CN    102547606 A    7/2012
CN    102857579 A    1/2013
(Continued)

OTHER PUBLICATIONS

Office Action dated Nov. 23, 2017 for Chinese Application No. 201310179646.6, 14 pages.
(Continued)

*Primary Examiner* — Liang Che A Wang
(74) *Attorney, Agent, or Firm* — Brinks Gilson & Lione

(57) ABSTRACT

The present disclosure has disclosed a method, an apparatus, and a system of opening a web page and belongs to the technical field of the Internet. Said method comprises: A binding relationship among terminals stored in advance in a server; said server receives the web page information of a target web page sent by the first terminal; according to the binding relationship among terminals stored in advance, said server determines the second terminal, which has a binding relationship with said first terminal; according to the web page information of said target web page, said server sends a notice of web page information to said second terminal so that said second terminal opens said target web page according to said notice of web page information.

10 Claims, 8 Drawing Sheets

Related U.S. Application Data continuation of application No. PCT/CN2014/072899, filed on Mar. 5, 2014.

(51) Int. Cl.
*H04L 29/08* (2006.01)
*G06F 3/0484* (2013.01)

(58) Field of Classification Search
USPC .................................. 709/203, 219, 227, 245
See application file for complete search history.

(56) References Cited

U.S. PATENT DOCUMENTS

| | | |
|---|---|---|
| 2002/0157023 A1 | 10/2002 | Callahan et al. |
| 2014/0066643 A1 | 3/2014 | Hain et al. |
| 2014/0203999 A1 | 7/2014 | Shim |

FOREIGN PATENT DOCUMENTS

| | | |
|---|---|---|
| CN | 102883029 A | 1/2013 |
| CN | 103095748 A | 5/2013 |
| EP | 1 591 911 A1 | 11/2005 |

OTHER PUBLICATIONS

International Search Report and Written Opinion dated Jun. 11, 2014 for International Application No. PCT/CN2014/072899, 8 pages.

METHOD, APPARATUS AND SYSTEM FOR OPENING A WEB PAGE

CROSS-REFERENCES TO RELATED APPLICATIONS

This application is a continuation of U.S. patent application Ser. No. 14/299,715, entitled "METHOD, APPARATUS, AND SYSTEM OF OPENING A WEB PAGE," filed Jun. 9, 2014, which is a continuation of International application PCT/CN2014/072899, entitled "METHOD, APPARATUS, AND SYSTEM OF OPENING A WEB PAGE," filed on Mar. 5, 2014, which claims priority to Chinese Patent Application No. 201310179646.6, filed on May 15, 2013, all of which are incorporated by reference herein in their entirety.

FIELD OF THE INVENTION

The present disclosure involves the technical field of the Internet and in particular a method, an apparatus, and a system of opening a web page.

BACKGROUND OF THE INVENTION

Along with rapid developments in Internet technology, a web browser has become one of the most common tools for acquiring information in daily life and work. Via a web browser, a user may browse web pages, play video and audio, do online shopping, and perform other Internet operations. Separately, it is common for an individual to use several devices to browse websites.

SUMMARY OF THE INVENTION

In order to resolve the problem in the state of the art, an embodiment of the present disclosure provides a method, an apparatus, and a system of retrieving a web page. In one aspect, a method of retrieving a web page is provided, a binding relationship among terminals stored in advance in a server, said method comprising: said server receives the web page information of the target web page sent by the first terminal; based on the binding relationship among terminals stored in advance, said server determines the second terminal, which has a binding relationship with said first terminal; based on the web page information of said target web page, said server sends a notice of web page information to said second terminal so that said second terminal opens said target web page based on said notice of web page information.

In another aspect, a method of transmitting web page information for a web page is provided, said method comprising: a first terminal acquires the web page information of a locally opened target web page; said first terminal sends to the server the web page information of said target web page so that based on the binding relationship among terminals stored in advance, said server determines the second terminal, which has a binding relationship with said first terminal, and, based on the web page information of said target web page, sends a notice of web page information to said second terminal so that said second terminal opens said target web page based on said notice of web page information.

In yet another aspect, a method of opening a web page is provided, said method comprising: the second terminal receives a notice of web page information sent by the server; said second terminal opens said target web page based on said notice of web page information; wherein, with regard to said notice of web page information, after receiving the web page information of said target web page sent by the first terminal, based on the binding relationship among terminals stored in advance, the server determines said second terminal, which has a binding relationship with said first terminal, and, based on the web page information of said target web page, sends the notice of web page information to said second terminal.

In still another aspect, a server is provided, said server comprising: a memory module configured to store in advance the binding relationship among terminals; a reception module configured to receive the web page information of the target web page sent by the first terminal; a determination module configured to, based on the binding relationship among terminals stored in advance, determine the second terminal, which has a binding relationship with said first terminal; a transmission module configured to, based on the web page information of said target web page, send to said second terminal the notice of web page information so that the second terminal opens said target web page based on said notice of web page information.

In one more aspect, a first terminal is provided, said first terminal comprising: an acquisition module configured to acquire the web page information of the locally opened target web page; a transmission module configured to send to said server the web page information of said target web page so that based on the binding relationship among terminals stored in advance, said server determines the second terminal, which has a binding relationship with said first terminal, and, based on the web page information of said target web page, sends a notice of web page information to said second terminal so that said second terminal opens said target web page based on said notice of web page information.

In still another aspect, a second terminal is provided, said second terminal comprising: a reception module configured to receive the notice of web page information sent by the server; an opening module configured to open said target web page based on said notice of web page information; wherein, with regard to said notice of web page information, after receiving the web page information of said target web page sent by the first terminal, based on the binding relationship among terminals stored in advance, the server determines said second terminal, which has a binding relationship with said first terminal, and, based on the web page information of said target web page, sends the notice of web page information to said second terminal.

In another aspect, a system of opening a web page is provided. Said system comprises a server, a first terminal, and a second terminal, wherein: said first terminal is configured to acquire the web page information of the locally opened target web page and send the web page information of said target web page to said server; said server is configured to receive the web page information of the target web page sent by said first terminal; based on the binding relationship among terminals stored in advance, determine said second terminal, which has a binding relationship with said first terminal; based on the web page information of said target web page, send a notice of web page information to said second terminal; said second terminal is configured to receive the notice of web page information sent by said server and open said target web page based on said notice of web page information.

BRIEF DESCRIPTION OF THE DRAWINGS

FIG. 1 is a block diagram of an example system.

DETAILED DESCRIPTION

Apparatuses described herein and methods implemented thereon receive a reference to an object from a first terminal and transmit the reference to a second terminal, based on determining that a relationship exists between the first and second terminal. The object may correspond to a webpage, an online video or music file etc. The first terminal and second terminal may be random terminals (a computer, cell phone, laptop, etc.). The first terminal and second terminal may be terminals bound to each other and the binding relationship between them may be stored in a server implementing methods described herein. The server preferably may be a back-end server of the web browser.

Figure 1:
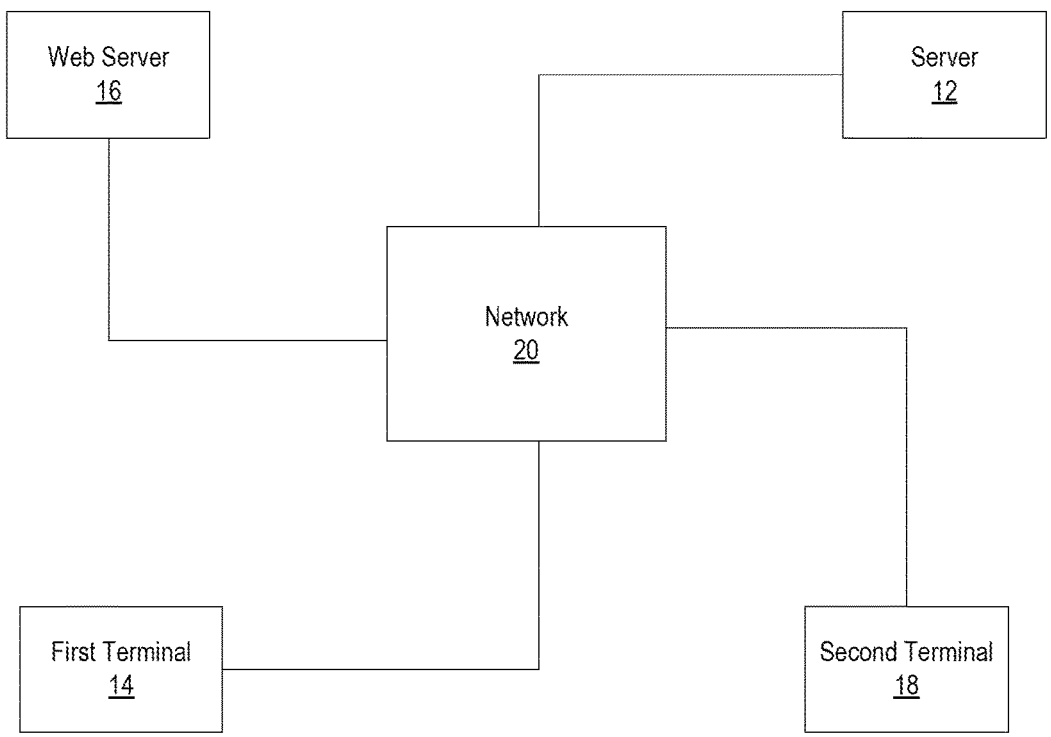
FIG. 1 is

FIG. 1 is block diagram of on an example system 10 wherein a server 12 may receive from a first terminal 14 a reference to a webpage located at webserver 16 and transmit the reference to a second terminal 18. The server 12 may transmit the reference to the second terminal 16 based on determining that a relationship exists between the first terminal 14 and the second terminal 18. By way of example and without limitation, in the example system 10, the first terminal 14 corresponds to a desktop computer and the second terminal 18 corresponds to a smartphone 16. The first terminal 14 may cause the transmission of a reference to a web page to the server 12 via the network 20 in response to detecting a condition on the first terminal 12. The network 20 may correspond to any combination of a wired and wireless network. Examples of wireless networks include those conforming to the GSM, GPRS, CDMA, WiFi protocol, for example. Examples of wired networks include WAN, LAN etc.

In an embodiment, server 12 may notify the second terminal 16 of the opening of a target web page on the first terminal 14. On the server side, the binding relationship among the first terminal 14 and second terminal 18 may be stored in advance. The server may store in advance the binding relationship among terminals. Such binding relationship may be established according to the pre-determined binding rules. For example, the first terminal 14 generates a certain feature code and notifies the second terminal 18 and then the first terminal 14 and second terminal 18 both send to the server binding requests carrying such feature code. The binding rules may be formulated randomly according to requirements and are not enumerated here.

Preferably, multiple terminals, which are logged in to the same account, may be bound, i.e. the binding relationship among multiple terminals, which are logged in to the same account, may be stored in advance on the server. Wherein, the account is the account for logging in to the web browser, in an embodiment. All registered accounts of such web browser may be stored in the server 12 of the web browser; account numbers, passwords, browse records, and favorites of all accounts may be stored; the log-in status of all accounts and all logged-in terminals corresponding to each account may also be recorded. With regard to any random account, when the account is already logged in, when detecting a new terminal logging in to such account, the server may record the binding relationship among the new log-in terminal of such account and the previous log-in terminals of such account. Specifically, a binding relationship table may be established in the server and the terminal identifiers corresponding to all terminals logged in to such account are stored in the binding relationship table. The identity of the new terminal may be established based on the media access control (MAC) address of the new terminal.

In an embodiment, the same web browser is installed on both the first terminal and second terminal, and the server corresponds to the back-end server of such web browser. In both the first terminal and second terminal, a user may be logged into the same account via the web browser on the first terminal and the web browser on the on second terminal.

Figure 2:
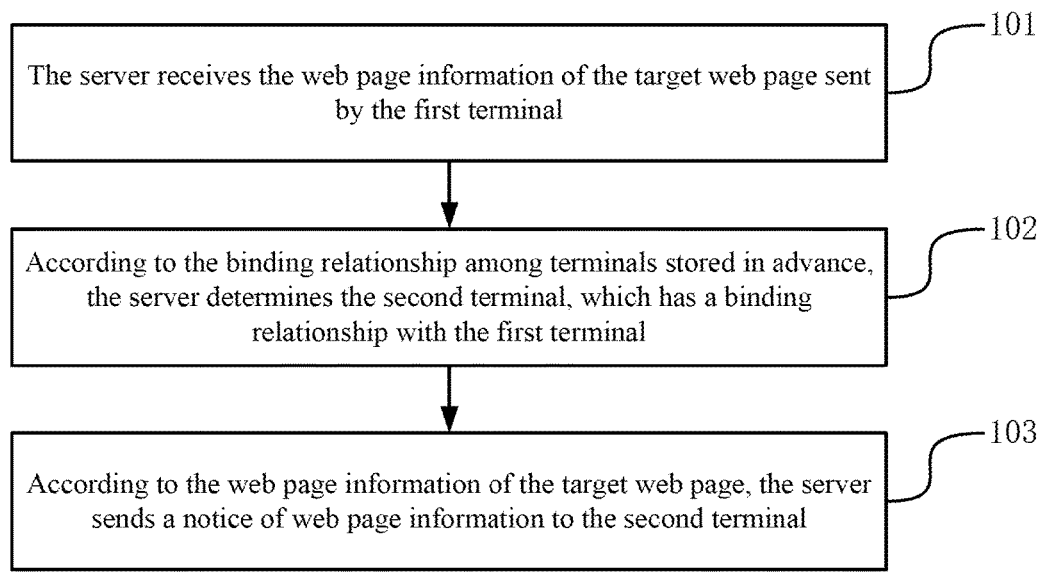
FIG. 2 is a flow diagram of an example method that may be implemented in the system of FIG. 1.

FIG. 2 is a flow diagram of an example method that may be implemented at server 12, in an embodiment. At block 101, the server 12 may receive the web page information of the target web page sent by the first terminal 12. As previously discussed, the target webpage may be located at webserver 16. In an embodiment, the server 12 may receive from the first terminal 14 the web page information of a target web page. The server 12 may also receive from the first terminal 14 an identifier of the first terminal 14. The target web page may correspond to a web page displayed in the web browser of the terminal 14, in an embodiment.

In one embodiment, the web page information of the target web page may correspond to the web address of the target web page and specifically may be the first category web address of the target web page. The first category web address may be a web address of a random web address category; for example, a WEB address, WAP (Wireless Application Protocol) address, and FTP (File Transfer Protocol) address.

In another embodiment, the web page information of the target web page may correspond to page data of the target web page. Page data may comprise raw page data, HTML code, JAVASCRIPT etc., user log-in information (information of logging in to the account of such web page by the user), recorded information in the web page (for example, the form being filled out by the user on such web page and written web logs), a cookie filed associated with the target web page etc.

In still another embodiment, the server 12 may also receive from the first terminal 14 an indication when a web browser displayed at the first terminal 14 is dragged outside the field of the display of the first terminal 14. For example, at block 102, server 12 may receive a percentage of the web browser displayed the first terminal 14 that is outside the view of the display.

At block 102, server 12 may determine that a binding relationship exists among first terminal 14 and second terminal 18. The binding relationship may be created in advance. As an example, a binding relationship may exist by virtue of both the first and second terminals being under the control of the same user. In an embodiment, based on the identifier of the first terminal 14 received with the aforementioned web page information, the server 12 may search for the corresponding identifier of the second terminal 18 in a binding relationship table and thus determine the second terminal 18, which has a binding relationship with the first terminal. At block 102, the second terminal 18 may determine the location of second terminal 18 on the network 20, in an embodiment.

At block 103, based on the web page information of the target web page, the server 12 may notifies the second terminal 18 of the web page information so that the second terminal 18 may retrieve and display the target web page based on web page information included with the notification.

In an embodiment where the web page information of the target web page is the page data of the target web page, the server 12 may send to the second terminal 18 the notice of web page information carrying the page data of the target web page. Specifically, the server 12 may receive the page data of the target web page sent by the first terminal 14 in the notice of web page information and send the page data to the second terminal 18 via the network 20. The server 18 may then transmit a notification including the web page information of the target web page to the second terminal opens the target web page according to the notice of web page information. Web page information may include the universal resource locator (URL) of the target web page, for example.

In the embodiment where the web page information of the target web page is a first category web address of the target web page, the server may send to the second terminal 18 the notice of web page information carrying the first category web address of the target web page. Specifically, the server 12 may transmit the first category web address of the target web page sent by the first terminal 14 in the notice of web page information and send the first category web address to the second terminal 18. For example, when the first terminal 14 and second terminal 18 are cell phones or tablets, the first category web address may be a WAP web address. When the first terminal 14 and the second terminal 18 are both personal computers, the first category web address may be a standard uniform resource locator (URL) address.

In a scenario where the first terminal 14 is a personal computer and the second terminal 18 is a cell phone, smart phone or a tablet, server 12 may translate the first category web address of the target web page to a second category web address of the target web page and transmit the second category address to the second terminal 18.

Specifically, based on the mutual conversion rules of the first category web address and second category web address of web pages of each web site stored in various web sites, the server 12 may convert the first category web address to the second category web address (for example, converting a WEB address to a WAP address or converting a WEB address to a WAP address). For example, server 12 may receive from terminal 14 the first category web address http://news.sohu.com/20130502/n374562384.shtml (WEB address) for a target web page. The server 12 may convert the first category web address to second category web address http://m.sohu.com/n/374562384/?wscrid=15257_1 (WAP address), wherein "20130502" is converted to "n" and "n374562384.shtml" is converted to "374562384"; "?wscrid=15257_1" which is a random number. By such conversion, the web address type sent to the second terminal 18 may better match the hardware and system of the second terminal 18.

Figure 3:
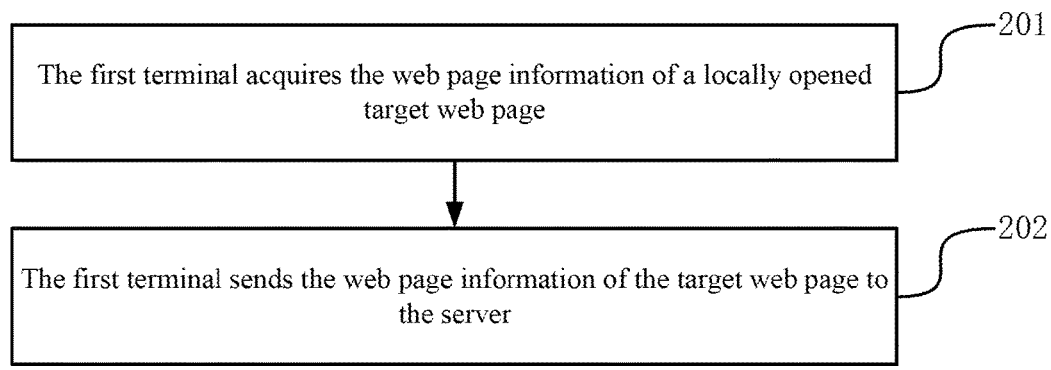
FIG. 3 is a flow diagram of another example method that may be implemented in the system of FIG. 1.
Figure 4:
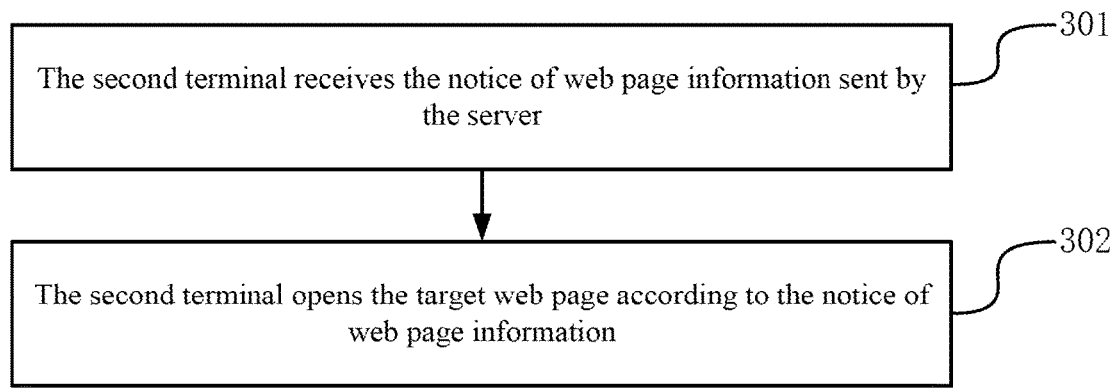
FIG. 4 is a flow diagram of yet another example method that may be implemented in the system of FIG. 1.

FIG. 3 is the flow diagram of an example method that may be implemented in an example first terminal 14 (the initiator of opening a web page). At block 201, the first terminal 14 acquires the web page information of a locally opened target web page, for example a webpage located at web server 16. The web page information may be acquired when the user at first terminal 14 navigates to the web page using a web browser executing on first terminal 14.

In an embodiment, the first terminal 14 may acquire the web page document of the target web page (the web page document contains the raw page data of the target web page, the recorded information of the target web page, and other information), such as an HTML file, and may also acquire the user log-in information of the target web page in the cookie file. In this embodiment, according to the page data of the target page, when the second terminal 18 receives from the server 12, the web page document, the second terminal 18 opens the target page in the web browser of the second terminal 18, restores the log-in status of the target page to the log-in status on the first terminal 14, and restores the log-in information of the target page in the first terminal 14.

In an embodiment block 201 may be triggered by a certain triggering event. The first triggering event may be a pre-determined random event. The first triggering event may be the receipt of a certain operating instruction. For example, a first triggering button is configured in the interface of the web browser (such as the location of the web page tag). In some embodiments, the first triggering button may correspond to the button of a browser plugin displayed in the toolbar of the web browser of terminal 14. After the first triggering button is clicked, at block 201 the first terminal 14 is triggered to acquire the web page information of the target web page. In another embodiment, the triggering event may correspond to a user locking the first terminal 14 by hitting a key stroke combination at a keypad of the first terminal 14, CTRL-ALT-DEL, for example.

In yet another embodiment, the first triggering event may be generated in response to a window, a web browser displaying the target web page for example, being dragged across the display of first terminal 14. For example, a first triggering event may be generated when a predetermined percentage of the window is dragged outside the view of the display of first terminal 14 or display area.

The first terminal 14 may first calculate the size information of the area outside the view of the display of first terminal 14. Such size information may comprise the length of all sides (four sides) of the area of the window that is displayed outside of the display, or include the ratio of the area of window that is displayed outside of the display to the total area of the window, etc. At block 201, the first terminal 14 may determine whether or not the acquired size information satisfies a pre-determined first size condition. The first size condition may be randomly configured according to requirements. For example, the first size condition may be set to be that the ratio of the area of the window that is displayed outside of the screen to the total area of the moving reduced window exceeds the pre-determined first threshold (for example, 0% and 10%). Thus, when the window is dragged to a certain location at the edge of the screen, the first terminal 14 is triggered to acquire the web page information of the target web page, in an embodiment.

At block 202, the first terminal 14 sends the web page information of the target web page to the server 12 so that, according to the binding relationship among the first and second terminals stored in advance, the server 12 identifies the second terminal 18. As previously discussed, the web page information of the target web page may be the page data of the target web page or the first category web address or the second category web address of the target web page. In one embodiment, the first terminal 14 may send to the server 12 via network 20 a transmission request of the web page information, which includes the web page information of the target web page and may further carry the identifier of the first terminal 14.

In another embodiment, first terminal 14 may detect a pre-determined second triggering event at block 202. The second triggering event may be a pre-determined random event. For example, the second triggering event may be the receipt of a certain operating instruction.

In another embodiment, the second triggering event may occur when the size of the area of the window of the target web page outside the view of the display of the first terminal satisfies a pre-determined second size condition. The first terminal 14 may determine whether or not the acquired size information satisfies the pre-determined second size condition. The second size condition may be randomly configured according to requirements. For example, the second size condition may be set to be that the ratio of the area of the window that is displayed outside of the screen to the total area of the window exceeds the pre-determined second threshold (for example, 60%). The pre-determined second size condition may be greater than the previously discussed pre-determined first size condition. In an embodiment, before sending the web page opening notice to the second terminal 18 via the server, the first terminal 14 may delay the sending of the web page information of the target web page to the server by a pre-determined time (for example, 0.5 second).

FIG. 3 is a flow diagram of an example method that may be implemented at the second terminal 18 (the executor of opening a web page), in one embodiment.

At block 301, the second terminal 18 receives the notice of web page information sent by the server 12. At block 302, the second terminal 18 opens the target web page according to the notice of web page information. Opening the target web page comprises receiving from the web server 14 the target web page html code, for example and displaying the target web page at the second terminal 18.

In another embodiment, second terminal 18 may receive web page information that includes the page data of the target web page or the second category web address of the target web page. In the embodiment in which the notice of web page information carries the page data of the target web page, the page data of the target web page may comprise the web page document (for example, an HTML file) of the target web page and the user log-in information of the target web page. The second terminal 18 may acquire the web page document in the page data, store the web page document locally, open the target web page in the web browser via such web page document, and restore the log-in information of the target web page in the first terminal. The second terminal 18 may also acquire the user log-in information in the page data, store such user log-in information in the local cookie file, and restore the log-in status of the target page in the first terminal through such user log-in information.

In scenarios where the notice of web page information includes the second category web address, the second terminal 18 may connect to the corresponding web site according to the second category web address to open the target web page at second terminal 18.

In one embodiment of the present disclosure, after receiving the notice of web page information, the second terminal 18 may immediately open the target web page based on the notice of web page information. In another embodiment, the second terminal 18 may open the target web page based on the notice of web page information in response to a triggering event.

In still another embodiment, second terminal 18 may open the target web page based on the notice of web page information, after a pre-determined length of time after receipt of the notice of web page information, for example, from the server 12.

In some embodiments, before opening the target web page upon receipt of the notice of web page information, the second terminal 18 may use a special display effect. Such display effect may be the moving a minimized window of the target web page displayed in the second terminal 18. The location of the moving minimized window may be determined according to the mouse location or the location where the finger touches the screen. Such display effect may also be a portion (for example, one-half) of the moving reduced window of the target web page displayed in the second terminal 18. The display location may be configured randomly and preferably at one of the edges of the screen.

Figure 5:
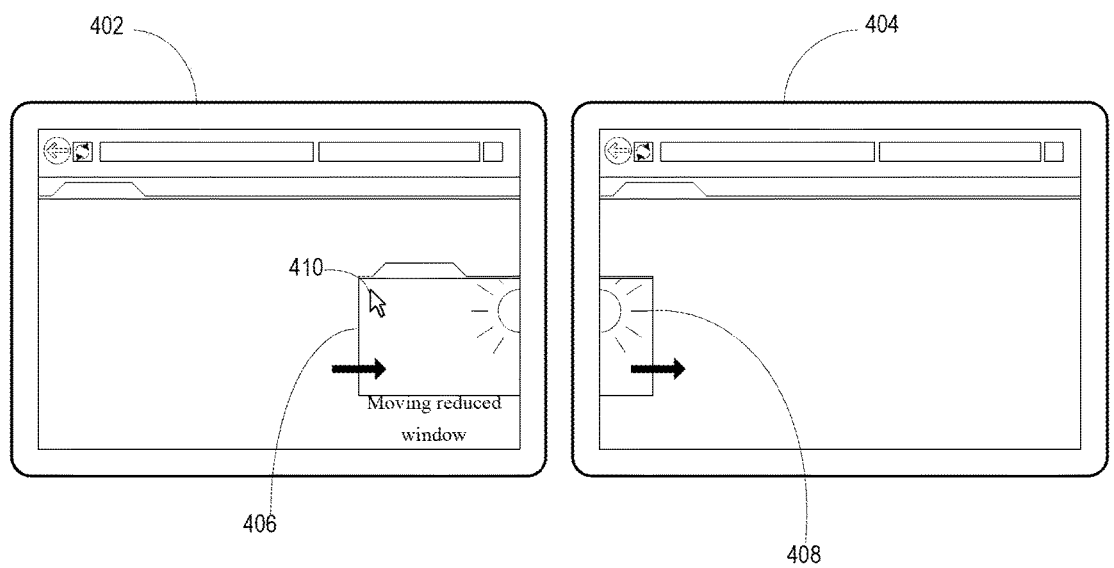
FIG. 5 is a schematic diagram of the terminal display effects as provided by an embodiment of the present disclosure.

FIG. 5 depicts the display 402 of an example first terminal 14 and the display 404 of an example second terminal 18, in one scenario. A user at first terminal 14 may drag a minimized thumbnail 410 of a web browser using a pointing device across the display 402. As previously described, dragging thumbnail 410 across the first terminal 14 may trigger an event when a pre-determined area of the thumbnail 410 is outside the field of view of display 402. Terminal 14 may transmit web page information of a target web page displayed in the minimized thumbnail 410, in response to the triggering event. Terminal 14 may also transmit the size information outside the field of view of display 402 of the minimized thumbnail 410 as previously discussed. As previously discussed, a server 12 may receive the web page information and based on previously stored binding information, server 12 may transmit or send a notice of the web page information to the second terminal 18. In an embodiment, server 12 may transmit to the second terminal 18 size information sent by the first terminal via the network 20. In response to receiving the notice of web page information and the size information, which is sent by the first terminal via the server, the second terminal 18 displays the image 412 whose size corresponds to the area of thumbnail 410 outside of the field of view of display 402.

When the thumbnail 410 is dragged across the display 402, the area of the thumbnail 412 displayed in the display 404 of the second terminal 18 will also be moved accordingly.

Figure 6:
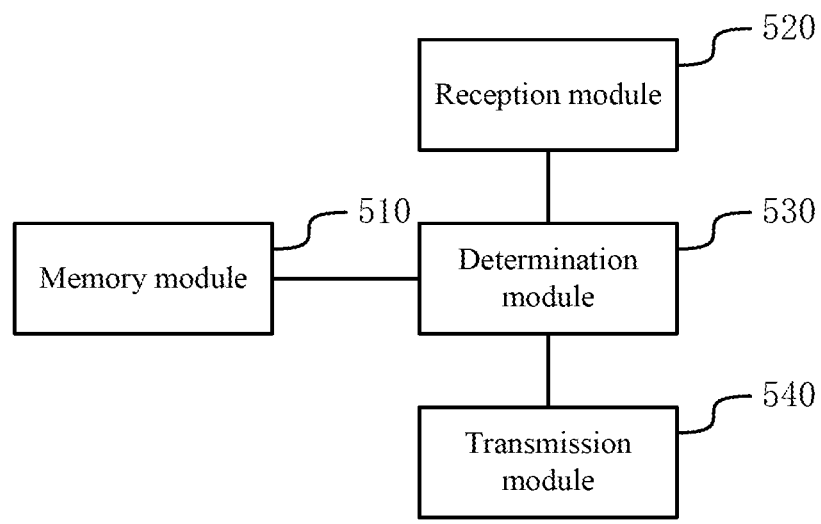
FIG. 6 is a structural diagram of an example server that may operate in the system of FIG. 1.

Based on the same technical concept, the embodiment of the present disclosure further provides a server, as shown in FIG. 6, said server comprising: a memory module 510 configured to store in advance the binding relationship among terminals, a reception module 520 configured to receive the web page information of the target web page sent by the first terminal, a determination module 530 configured to, according to the binding relationship among terminals stored in advance, determine the second terminal, which has a binding relationship with said first terminal, a transmission module 540 configured to, according to the web page information of said target web page, send to said second terminal the notice of web page information so that said second terminal opens said target web page according to said notice of web page information.

The transmission module 540 may be configured to send to said second terminal the notice of web page information carrying the first category web address of said target web page; or, according to the first category web address of said target web page, determine the corresponding second category web address of said target web page and send to said second terminal the notice of web page information carrying the second category web address of said target web page.

The transmission module 540 may be further configured to receive the size information, which is sent by said first terminal, wherein the size information corresponds to of the area a window of said target web page that is displayed on the screen of said first terminal, and send said size information to said second terminal.

Figure 7:
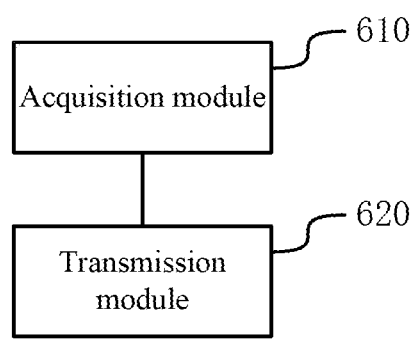
FIG. 7 is a structural diagram of an example first terminal that may operate in the system of FIG. 1.

FIG. 7 is a block diagram of an example first terminal. In this example, first terminal comprises an acquisition module 610 configured to acquire the web page information of the locally opened target web page, a transmission module 620 configured to send to the server the web page information of said target web page so that according to the binding relationship among terminals stored in advance, said server determines the second terminal, which has a binding relationship with said first terminal and, according to the web page information of said target web page, sends a notice of web page information to said second terminal so that said second terminal opens said target web page according to said notice of web page information.

The acquisition module 610 is configured to detect the triggering events described with reference to FIG. 3. In response to detecting a triggering event, acquisition module 610 may acquire the web page information of the locally opened target web page.

The transmission module 620 may be further configured to detect a pre-determined second triggering event after sending to said server the web page information of said target web page. The second triggering event may be generated when an area outside of a window displaying said target web page satisfies the pre-determined second size condition. The transmission module 620 may further be configured to delay sending the web page opening notice to said second terminal via said server, by a pre-determined time.

Figure 8:
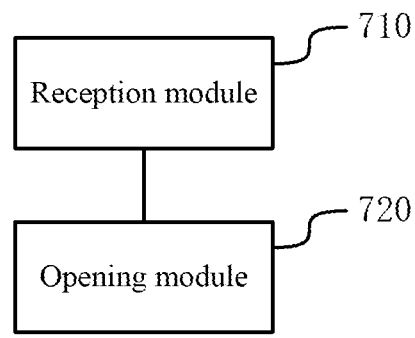
FIG. 8 is a structural diagram of an example second terminal that may operate in the system of FIG. 1.

Based on the same technical concept, the embodiment of the present disclosure further provides a second terminal, as shown in FIG. 8, said second terminal comprising a reception module 710 configured to receive the notice of web page information sent by the server, an opening module 720 configured to open said target web page according to said notice of web page information; wherein, with regard to said notice of web page information, after receiving the web page information of said target web page sent by the first terminal, according to the binding relationship among terminals stored in advance, said server determines said second terminal, which has a binding relationship with said first terminal, and, according to the web page information of said target web page, sends the notice of web page information to said second terminal.

In an embodiment, the notice of web page information carries the page data of said target web page or the second category web address of said target web page. In this embodiment, said opening module 720 is configured to when receiving the web page opening notice sent by said first terminal via said server, open said target web page according to said notice of web page information. In one embodiment, said opening module 720 is configured to after a pre-determined length of time upon receipt of said notice of web page information, open said target web page according to said notice of web page information.

In the embodiment of the present disclosure, after receiving the web page information of the target web page sent by the first terminal, according to the binding relationship among terminals stored in advance, the server determines the second terminal, which has a binding relationship with said first terminal, and then, according to the web page information of the target web page, sends a notice of web page information to the second terminal so that the second terminal opens the target web page according to the notice of web page information. Doing so, during the course of opening the web page, the server does not need to store corresponding information of the Favorites and thus the use of memory resources of the server may be reduced.

It is necessary to point out that: When the apparatus of opening a web page as provided by the aforementioned embodiment opens a web page, the aforementioned various functional modules are divided for illustration only. In actual application, the aforementioned functions may be distributed to different functional modules for completion according to requirements, i.e. the internal structure of the apparatus is divided into different functional modules to complete all or some of the functions described above. Moreover, the apparatus of opening a web page as provided in the aforementioned embodiment has the same concept as that of the embodiment of the method of opening a web page. Refer to the embodiments of the method for the specific implementation process, which are not discussed in detail again here.

The sequence of the aforementioned embodiments of the present disclosure is for description only and does not represent the merits of the embodiments.

Those of ordinary skill in the art may understand that the implementation of all or some of the steps of the aforementioned embodiments may be completed by hardware and may also be completed by programs commanding corresponding hardware. Said programs may be stored in a computer-readable memory medium. The memory medium mentioned above may be a read-only memory, disk, CD, etc.

The aforementioned are merely better embodiments of the present disclosure and shall not restrict the present disclosure. As long as they are within the spirit and principle of the present disclosure, all modifications, equivalent replacements and improvements shall be included in the protection scope of the present disclosure.

The invention claimed is:

1. A method comprising:
   accessing, by a first terminal, a target web page from a web server;
   hiding, by the first terminal and in response to a triggering event, page data of the target web page displayed by a browser window at the first terminal;
   sending, by the first terminal to a terminal server different from the web server, web page information corresponding to the target web page accessed by the first terminal;
   receiving, by a second terminal, a notice of web page information sent by the terminal server based on a binding relationship stored at the terminal server, the binding relationship between the first terminal and the second terminal;
   accessing, by the second terminal, in response to the notice of web page information, the target web page from the web server, wherein the notice of web page information includes:
     an instruction to the second terminal to access the target web page from the web server, and
     an instruction to the second terminal to display the page data that is hidden by the first terminal; and
   displaying, by the second terminal, based on size information included in the notice of web page information, the page data of the target web page that is hidden by the first terminal.

2. The method of claim 1, wherein the size information corresponds to the page data hidden on the first terminal.

3. The method of claim 1, wherein hiding the page data further comprises;
   detecting, at the first terminal, a dragging operation on the browser window;
   displaying, at the first terminal, a reduced browser window, the reduce browser window including the page data;

relocating the reduced browser windows to an edge of a display interface of the first terminal; and removing the page data from the display interface in response to the reduced browser window relocated to the edge of the display interface.

4. The method of claim 1, wherein in the step of accessing, by the second terminal, further comprises: accessing, by the second terminal, the target web page from the web server based on a web address of the target web page included in the notice of web page information.

5. The method of claim 1, wherein the triggering event comprises at least one of receipt of a button click on a web browser at the first terminal, receipt of a button click on a tag of a web page at the first terminal, receipt of a resize command in a browser window at the first terminal, or receipt of a lock command of the first terminal.

6. A system comprising:
a first terminal and a second terminal, the first terminal comprising a processor configured to:
  access a target web page from a web server;
  hide, in response to a triggering event, page data of the target web page displayed by a browser window at the first terminal;
  send, to a terminal server different from the web server, web page information corresponding to the target web page accessed by the first terminal,
wherein second terminal comprises a processor configured to:
  receive a notice of web page information sent by the terminal server based on a binding relationship stored at the terminal server, the binding relationship being between the first terminal and the second terminal, the notice of web page information comprising instructions to the second terminal to access the target web page from the web server and instructions to the second terminal to display the page data that is hidden by the first terminal;
  access in response to the notice of web page information, the target web page from the web server; and
  display, based on size information included in the notice of web page information, the page data of the target web page that is hidden by the first terminal.

7. The system of claim 6, wherein the size information corresponds to the page data hidden on the first terminal.

8. The system of claim 6, wherein to hide the page data, the processor of the first terminal is further configured to:
  detect, at the first terminal, a dragging operation on the browser window;
  display, at the first terminal, a reduced browser window, the reduce browser window including the page data;
  reallocate the reduced browser windows to an edge of a display interface of the first terminal; and
  remove the page data from the display interface in response to the reduced browser window relocated to the edge of the display interface.

9. The system of claim 6, wherein to access in response to the notice of web page information, the target web page from the web server, the processor of the second terminal is further configured to access the target web page from the web server based on a web address of the target web page included in the notice of web page information.

10. The system of claim 6, wherein the triggering event comprises at least one of receipt of a button click on a web browser at the first terminal, receipt of a button click on a tag of a web page at the first terminal, receipt of a resize command in a browser window at the first terminal, or receipt of a lock command of the first terminal.

* * * * *